July 29, 1958   A. F. HASBROOK   2,845,621
METHOD AND APPARATUS FOR DETERMINING TIME DELAY IN PULSE REPEATERS
Filed Aug. 3, 1953   2 Sheets-Sheet 1
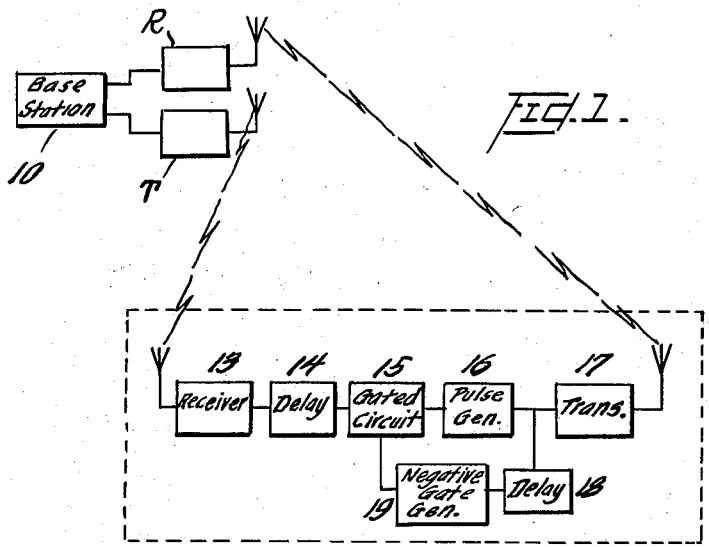
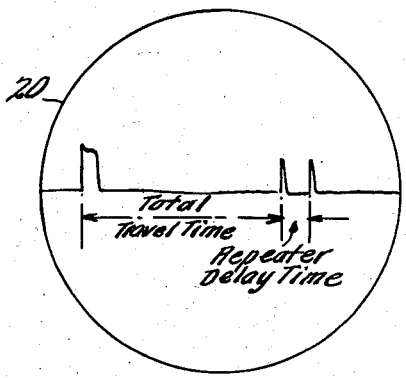
INVENTOR
Arthur F. Hasbrook,
BY Watson, Cole, Grindle & Watson
ATTORNEYS July 29, 1958  A. F. HASBROOK  2,845,621
METHOD AND APPARATUS FOR DETERMINING TIME DELAY IN PULSE REPEATERS
Filed Aug. 3, 1953  2 Sheets-Sheet 2
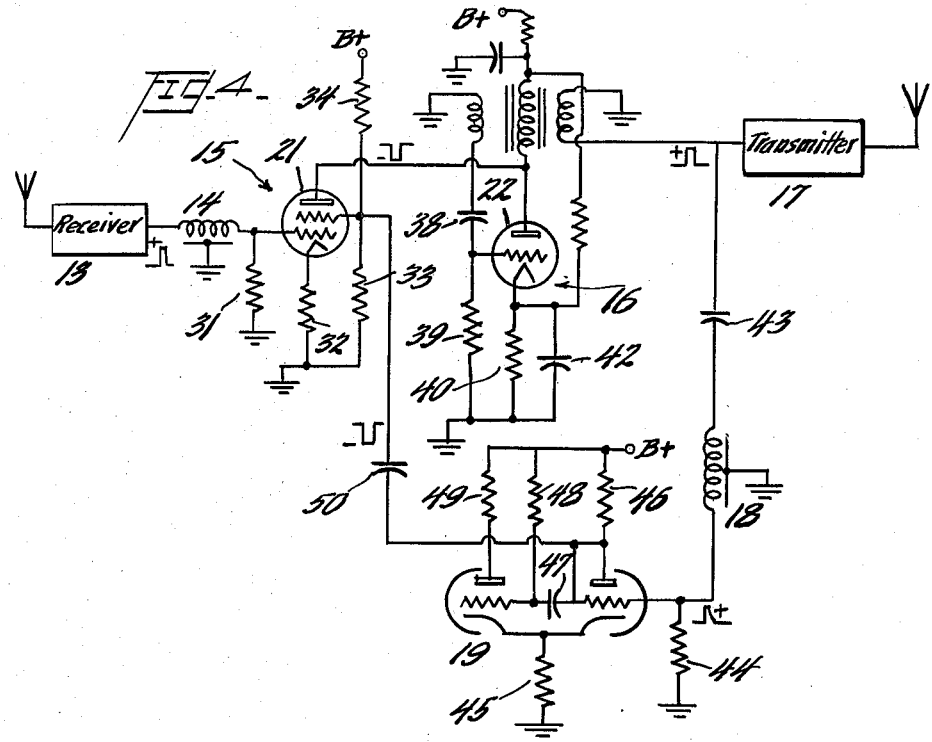
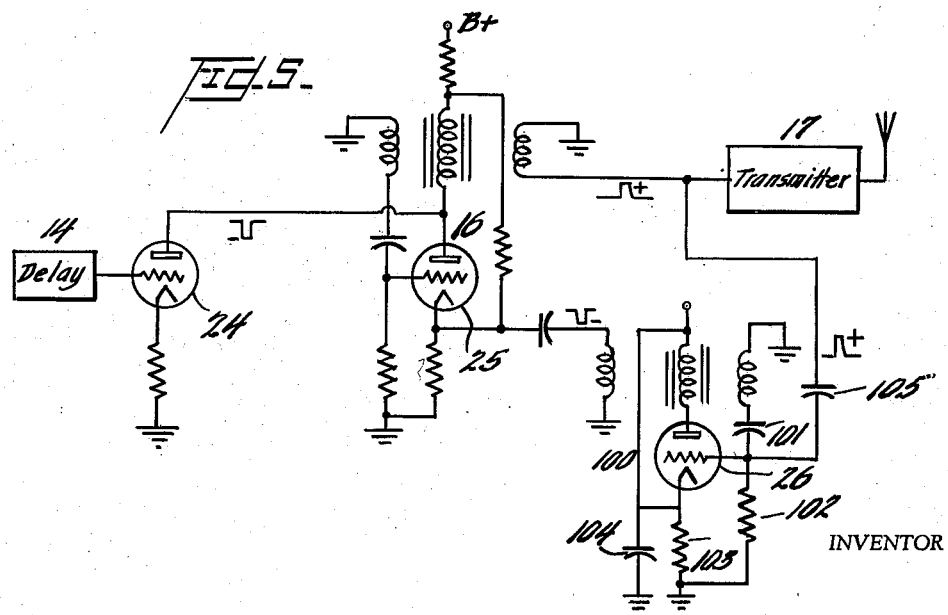
INVENTOR
Arthur F. Hasbrook
BY
Watson, Cole, Grindle & Watson
ATTORNEYS

United States Patent Office 2,845,621
Patented July 29, 1958

2,845,621

METHOD AND APPARATUS FOR DETERMINING TIME DELAY IN PULSE REPEATERS

Arthur F. Hasbrook, Bexar County, Tex., assignor to Olive S. Petty, San Antonio, Tex.

Application August 3, 1953, Serial No. 372,127

6 Claims. (Cl. 343—13)

This invention relates to improvement in apparatus for use in the electronic measurement of distances by transmission of radio pulses, and is more particularly concerned with the measurement and adjustment of the time delays inherent in certain apparatus employed in such systems.

It is a common expedient, in the measurement of distance by radio signaling to transmit a timing signal from a master or base station to a distant repeater station at which the signal is received and again transmitted or re-radiated for reception at the base station. The interval of time which elapses between the transmission of the initial signal from the base station and the arrival of the retransmitted signal thus is a measure of the distance between the two stations. For highest possible accuracy, it is necessary to determine and allow for the time delays inherent in certain circuit elements. Although proper design and arrangement may minimize or compensate for delays occurring at the master station, the time delay at the distant repeater station usually offers difficulty, especially since delay may there be deliberately introduced for the purpose of equalizing the total delay at each of several repeater stations.

The velocity of short radio waves over the earth is now known to a high degree of accuracy, and since precise timing circuits utilizing crystal controlled oscillators and well calibrated ranging circuits can be devised, the overall travel time can be measured quite accurately. The delay time of the repeater is included in this overall time, however, and presents a serious problem in that it is variable with the strength of the received signal and with changes in the circuit components themselves. For example, it is common for the circuit delay due to the above causes to vary as much as 50 to 100 ft. in 100,000 ft., although the time measuring accuracy of the equipment at the base station may be many times greater.

Where a considerable amount of heavy equipment is permissible, the repeater delay time may be monitored and held at a fixed value, by the use of the method and apparatus disclosed in my prior U. S. Patent No. 2,604,622, granted July 27, 1952. However, in the field of electronic surveying, the use of highly portable equipment is often essential, and in such cases it may be desirable to employ other methods and means for determining with accuracy the delay time at a repeater station.

It is therefore an object of the instant invention to provide, in a distance measuring system, a novel method and means whereby the repeater delay time may be readily determined by the retransmission of that time, or of a value which is representative of that time, through the use of simple and readily portable equipment.

It is a further object to provide a novel method and means of indicating at a base station the time delay at a repeater station, in which the information is so coded at the repeater station as to avoid any possibility of confusion with the principal function of distance measuring.

Further objects and features of the invention will be apparent from the following description taken in connection with the accompanying drawings, in which Figure 1 is a block diagram showing the principal components of a system embodying the principles of the instant invention;

Figure 2 is a series of curves illustrative of signals produced at different points in the system shown in Figure 1;

Figure 3 represents a cathode ray screen showing a typical display obtained by the use of the system of Figure 1;

Figure 4 is a wiring diagram showing in more detail the construction of certain components illustrated in Figure 1; and Figure 5 is a wiring diagram showing a modification of the circuit illustrated in Figure 4.

The nature of the invention can best be explained by first describing generally the system illustrated in Figure 1, it being understood that the embodiments illustrated in the drawings are intended merely as illustrative of the principle of the invention. Preferred circuits for the performance of certain functions, shown more particularly in Figures 4 and 5, will then be described in detail, such modifications of the whole system and of the specific circuits being contemplated as would normally occur to those skilled in the art to which the invention relates.

In Figure 1 is represented at 10 a master or base station at which conventional transmitting, receiving, and measuring equipment may be located. The details of the equipment at this station form no part of the instant invention, it being required only that the station shall have transmitting apparatus capable of sending a pulsed signal to one or more repeater stations, and of receiving from the repeater station or stations the retransmitted signal, together with adequate means for measuring the time interval between the radiation of pulses and the arrival of the retransmitted pulses. The transmitter and receiver at the base station are represented at T and R respectively.

The novelty, as hereinbefore indicated, resides in the method and apparatus employed at the repeater station, whereby signals representative of the delay in retransmission of the signal are generated and returned to the base station. Thus the pulse signal radiated from station 10 is intercepted by the receiver 13 at the repeater station, and is passed from the receiver through a delay line 14 to a gated circuit 15 and thence to a pulse generator 16. The output of the pulse generator energizes a transmitter 17 which re-radiates the signal to receiver R at the base station 10. It will be appreciated that with the exception of the gated circuit, the purpose of which will be hereinafter explained, the apparatus thus far described is entirely conventional, and functions merely to transmit information whereby the time interval between the sending of a pulse from the base station and the arrival at the base station of the pulse retransmitted from the repeater station can be accurately determined. The usual cathode ray screen, illustrated diagrammatically in Figure 3, may be employed at the base station to afford a visual indication of the time interval to be measured.

In the present system, the transmitter 17 at the repeater station not only serves to return the signal pulse to the base station, but the same pulse is also intercepted by the receiver 13 at the repeater station, or is returned from transmitter 17 to receiver 13 by a wired connection, and is passed through the components 14 to 16 and again radiated by the transmitter 17, this second pulse, as received at the base station 10, being spaced from the first received pulse by an interval representative of the delay in time caused by the passing of a given signal pulse through the equipment at the repeater station.

The second pulse radiated by transmitter 17 will, of course, also be fed to receiver 13 at the repeater station, and it is one of the objects of the instant invention to prevent further repetition and radiation of pulses derived from the initial pulse transmitted from the base station 10.

In the illustrated embodiment, this result is achieved by applying part of the output of the pulse generator through a delay line 18 to a negative gate generator 19, which controls in turn the passage of signal energy between the receiver 13 and the transmitter 17, for instance by delivering a blocking signal to gated circuit 15, so as to render the latter ineffective to transmit signal energy to the pulse generator. The timing of the blocking or deactuating signal so applied to the gated circuit 15 is such as to prevent application to the pulse generator 16 of the third pulse of a series of pulses, whereby ringing, or the repeated return of signal energy from transmitter 17 to receiver 13, is interrupted after the first pulse and the first repetitive pulse have been radiated by the transmitter 17. It will be appreciated that the first of these two radiated pulses, when received at the base station, affords a measure of the total elapsed transmission time between the base and repeater stations in the customary way, and that the phase displacement of the second of these two pulses affords a measure of the delay at the repeater station.

This may be understood more clearly by reference to the wave forms shown in Figure 2. Thus there is indicated at A a series of three pulses representing the output of the receiver 13. The first of these pulses corresponds to the initial pulse radiated from the base station 10 and intercepted by receiver 13 at the repeater station. Upon the retransmission to the base station from the repeater station by transmitter 17 of this first pulse, the retransmitted pulse is also returned to the receiver 13 and appears as the second pulse in the series A. This second pulse is then passed through the several components at the repeater station, radiated by the transmitter 17, and concurrently returned to the receiver 13, and appears in the output of receiver 13 as the third pulse in series A. As pointed out hereinbefore, it is desired to avoid confusion of the record at the base station by suppressing this third pulse of the series.

After passing through the delay line or circuit 14, the three pulses appearing in sequence at the receiver output are retarded in time, and may appear as shown at B in Figure 2, which represents the input of gated circuit 15. The output of the gated circuit is represented at C, it being observed that the third pulse has been removed; this is achieved by operation of the negative gate generator 19 in response to signal pulses, shown at D, derived from pulse generator 16.

Thus the output of pulse generator 16 is supplied to transmitter 17, resulting in radiation of the corresponding pulses shown at E, and is also passed through the delay line or circuit 18 to the negative gate generator 19 as shown at F. The first of the two pulses actuates the generator 19 to supply to gated circuit 15 a negative gating pulse, represented at G, which renders the circuit 15 temporarily inoperative for the passing of signal energy.

The second of the two pulses shown at F exerts no effect on the negative gate generator 19 owing to the design of the latter. The delay line 18 is so adjusted that the negative pulse G is applied to the gated circuit prior to the arrival of the third pulse shown at B, and after the second of this series of pulses, so that the third pulse is not passed to the pulse generator, and undesirable repetition or ringing is avoided. Negative pulse G terminates prior to the arrival at gated circuit 15 of the next succeeding pulse from the base station. It will therefore be appreciated that the sole function of the components 15, 18 and 19 of the system is to terminate, after two pulses, the series of pulses passing through the repeater station which are initiated by each pulse radiated from the base station.

One suitable circuit for performing the function just described is shown in Figure 4, in which corresponding reference characters are used to designate components shown generally in Figure 1. Referring to Figure 4, a pulse arriving at receiver 13 is applied through delay line 14 to a gated circuit indicated generally at 15 and comprising a tetrode 21, the output of which is applied to the anode of triode 22. The circuit including triode 22, represented generally at 16 in Figure 1, serves as a pulse generator of the blocking oscillator type. The pulses delivered by generator 16 are applied to transmitter 17 and thereby concurrently radiated to the base station 10 and returned to the receiver 13 of the repeater station, as hereinbefore described.

The negative gate generator, indicated generally at 19 and including tube 23 and the several circuit elements 44 to 49, is of the cathode coupled multivibrator type which is triggered by the first output pulse from pulse generator 16, the pulse being passed through condenser 43 and delay line 18.

Pulse generators of the blocking oscillator type such as employed at 16, or multivibrators such as shown at 19, are usually unable to respond to a second pulse or trigger signal following too closely upon a first energizing pulse; in other words, the trigger repetition rate for such generators has a definite upper limit, the limit depending upon the design of the generator. In the case of the negative gate generator 19, this common characteristic serves to render ineffective the second pulse applied to it, and is therefore desirable. It is essential, however, that the pulse generator 16 respond to the second pulse as well as to the first, and it is therefore desirable to reduce the recovery time to a minimum. The failure of response of pulse generator 16 for a finite period following the arrival of the first pulse is caused primarily by the constants of the grid-cathode circuit networks consisting of capacitors 38, 42, and resistors 39, 40 and discharge through these networks may be minimized by properly selecting the values of these elements, the recovery time being readily reducible to about 1.0 microsecond. This will ordinarily enable the pulse generator 16 to respond to the successive pulses which are impressed upon it.

The value of delay line 18 is just sufficient to prevent actuation of negative gate generator until the first two pulses of a series have passed through gated circuit 15, while permitting the application to circuit 15 of the negative gating signal from generator 19 in sufficient time to prevent the passage through circuit 15 of the third pulse of a series. Tetrode 21 of gated circuit 15 is rendered normally conducting by virtue of the screen voltage applied through resistor 34, but becomes nonconducting immediately upon the arrival of the negative gating signal supplied from generator 19, which may be applied either to the screen grid or any other suitable electrode of tetrode 21.

Since the pulse duration is usually quite short as compared to the pulse repetition rate, it will be appreciated that wide variation in the duration of the negative gating signal developed by generator 19 is permissible, and it is not difficult, to ensure, therefore, that gated circuit 15 will pass only the first two pulses of any series delivered by receiver 13, so that ringing or retriggering will be suppressed. While the transmitter 17 could be allowed to radiate a number of pulses, each separated by the delay time of the circuit, this would place an undesirable load on the duty cycle of the transmitter 117 and would result in confusion on the display at the base station 10. The extreme simplicity of the coding produced by the present system is apparent from inspection of Figure 3.

Thus Figure 3 shows diagrammatically a cathode ray tube 20, on which incoming signals from the repeater station may be displayed for comparison with the initial pulse from the base station. In the display represented in Figure 3, the first pulse is that which is transmitted from the base station 10, the second and third pulses being those retransmitted from the repeater station. The total travel time is given by the spacing between the first and second pulses, in the usual manner, whereas the delay time in the repeater, which may be subtracted from the total travel time to give the actual travel time irrespective of delay in the repeater, is represented by the spacing between the second and third pulses. Any delay in the receiving equipment at the base station can, of course, be the subject of compensation by conventional means. It will be appreciated, therefore, that the system herein described makes it possible to eliminate the effect of any variation in delay time, either at the repeater station or at the base station.

In the modified circuit shown in Figure 5, signals are delivered from delay line 14 to a triode 24, the output of which is impressed on the anode of triode 25, constituting an element of the pulse generator indicated generally at 16, which functions as a blocking oscillator. The output of generator 16 is applied to transmitter 17.

Pulse generator 16 is designed to provide a recovery time constant such that it will not be triggered by a second pulse from triode 24 following too closely upon a first pulse. Preferably the recovery time constant of generator 16 is reduced by the operation of a blocking oscillator circuit indicated generally at 100, which serves as a negative gate generator to supply negative pulses to the grid-cathode circuit of triode 25. Thus upon the delivery of the first signal pulse from generator 16 to transmitter 17, the pulse is also passed through condenser 105 to grid of triode 26 of blocked oscillator 100, and a negative pulse is applied thereby to the cathode of triode 25, to reduce the negative grid bias of tube 25 and permit triggering of pulse generator 16 by the next succeeding pulse. The negative pulse so fed by blocking oscillator 100 to triode 25 is of sufficient duration to allow triggering of generator 16 by the second pulse, but not by a third pulse. Blocking oscillator 100 is designed with a substantial recovery time constant by appropriate selection of the values of elements 101 to 104, and thus does not respond when the second pulse is applied to the grid of triode 26. Consequently the entire circuit becomes quiescent after the delivery to the transmitter 17 of the second pulse of a series by pulse generator 16.

Having thus described the invention, what is claimed as new and desired to be secured by Letters Patent is:

1. Apparatus for use in an electronic distance measuring system to determine the delay time at a repeater station comprising, in combination, a receiver for intercepting pulsed signals from a base station, transmission means energized from said receiver for retransmitting pulses to said base station and returning such retransmitted pulses to said receiver, and devices responsive to the pulsed signals for preventing energization of said transmission means by pulses returned therefrom to said receiver following the first such returned pulse of a series, whereby for each pulse arriving at said receiver, only two pulses are radiated to said base station, the total transmission time being given by the first of such pulses, and the delay at the repeater station being given by the interval between the two pulses.

2. Apparatus for use in an electronic distance measuring system to determine the delay time at a repeater station comprising, in combination, a receiver for intercepting pulsed signals from a base station, a transmitter energized from said receiver for retransmitting pulses to said base station and to said receiver, and devices interposed between said receiver and said transmitter and responsive to the pulsed signals for preventing energization of said transmitter by retransmitted pulses following the first such retransmitted pulse of a series, whereby for each pulse arriving at said receiver, only two pulses are radiated to said base station, the total transmission time being given by the first of such pulses, and the delay at the repeater station being given by the interval between the two pulses.

3. Apparatus as claimed in claim 2 in which the said devices include a gated circuit through which the received pulsed signals are passed to said transmitter, and a generator for supplying to said gated circuit a blocking signal to prevent passage through said gated circuit of the third pulse of a series, and means energizing said generator by the received pulsed signals.

4. Apparatus as claimed in claim 2 in which the said devices include a delay line, a gated circuit, and a pulse generator in series through which the received pulsed signals are passed to said transmitter, and a delay line and a negative gate generator in series to which the pulsed signals are applied, said negative gate generator supplying to said gated circuit a negative gating signal to prevent passage through said gated circuit of the third pulse of a series.

5. Apparatus for use in an electronic distance measuring system to determine the delay time at a repeater station comprising, in combination, a receiver for intercepting pulsed signals from a base station, transmission means energized from said receiver for retransmitting pulses to said base station and returning such retransmitted pulses to said receiver, and devices responsive to the pulsed signals for preventing energization of said transmission means by pulses returned therefrom to said receiver following the first such returned pulse of a series, said devices comprising a circuit interposed between said receiver and said transmitter, and a generator operable by the pulsed signals for so controlling the operation of said circuit as to permit passage therethrough of the first two pulses only of a series of pulses, whereby for each pulse arriving at said receiver, only two pulses are radiated to said base station, the total transmission time being given by the first of such pulses, and the delay at the repeater station being given by the interval between the two pulses.

6. In apparatus for use in distance measuring of the type comprising a transmitter radiating a pulsed signal at a base station, a first receiver for said pulsed signal and a second transmitter energized by said receiver at a repeater station, a second receiver at said base station for receiving pulsed signals radiated at said repeater station, and means at said base station for measuring the time difference of pulsed signals returned from said repeater station, the combination at said repeater station with the first receiver and second transmitter there located, of means returning signals radiated by said second transmitter to said first receiver, and devices interposed between said first receiver and second transmitter for blocking energization of said second transmitter after energization thereof in response to a pulse radiated from said base station and the following pulse returned from said second transmitter, whereby said second transmitter radiates to said base station two pulses having a time difference which is a measure of the overall delay at said repeater station.

References Cited in the file of this patent
UNITED STATES PATENTS
2,604,622     Hasbrook _____ July 22, 1952